United States Patent
Kim

(10) Patent No.: US 10,819,539 B2
(45) Date of Patent: Oct. 27, 2020

(54) SIGNAL SOURCE ESTIMATION METHOD AND APPARATUS PERFORMING THE SAME

(71) Applicant: Electronics and Telecommunications Research Institute, Daejeon (KR)

(72) Inventor: Jung-Bin Kim, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/702,312

(22) Filed: Dec. 3, 2019

(65) Prior Publication Data
US 2020/0186392 A1    Jun. 11, 2020

(30) Foreign Application Priority Data

Dec. 5, 2018  (KR) .......................... 10-2018-0155396
Nov. 8, 2019  (KR) .......................... 10-2019-0142791

(51) Int. Cl.
*H04L 25/02*    (2006.01)

(52) U.S. Cl.
CPC ........ *H04L 25/021* (2013.01); *H04L 25/0242* (2013.01); *H04L 25/0248* (2013.01); *H04L 25/025* (2013.01)

(58) Field of Classification Search
CPC .............. H04L 25/021; H04L 25/0242; H04L 25/0248; H04L 2/025
See application file for complete search history.

(56) References Cited

U.S. PATENT DOCUMENTS

| | | | |
|---|---|---|---|
| 2011/0281539 A1* | 11/2011 | Yamada | H04B 7/086 455/269 |
| 2012/0223811 A1* | 9/2012 | Wild | G01S 3/48 340/10.1 |
| 2014/0225804 A1* | 8/2014 | Wild | H04Q 9/00 343/876 |
| 2016/0218428 A1 | 7/2016 | Jung et al. | |
| 2017/0141482 A1 | 5/2017 | Park et al. | |
| 2017/0338900 A1* | 11/2017 | Shimbo | H04B 7/086 |
| 2019/0137596 A1* | 5/2019 | Silverman | H04B 7/0802 |
| 2019/0346533 A1* | 11/2019 | Robinson | G01S 3/50 |
| 2020/0057130 A1* | 2/2020 | Simileysky | G01S 3/48 |

FOREIGN PATENT DOCUMENTS

| | | |
|---|---|---|
| KR | 101274554 B1 | 6/2013 |
| KR | 1020180113267 A | 10/2018 |

OTHER PUBLICATIONS

Mati Wax et al., "Detection of Signals by Information Theoretic Criteria", IEEE Transactions on Acoustics, Speech, and Signal Processing, Apr. 1985, pp. 387-392, vol. ASSP-33, No. 2, IEEE.

* cited by examiner

*Primary Examiner* — Jaison Joseph
(74) *Attorney, Agent, or Firm* — William Park & Associates Ltd.

(57) ABSTRACT

Disclosed is a signal source estimation method and apparatus performing the same, the signal source estimation method including acquiring first reception signals received by first receivers, among signals radiated from signal sources, selecting second receivers receiving reception signals to be used to estimate the signal sources, from among the first receivers based on the first reception signals, and detecting the number of signal sources based on second reception signals received by the second receivers.

20 Claims, 10 Drawing Sheets

400

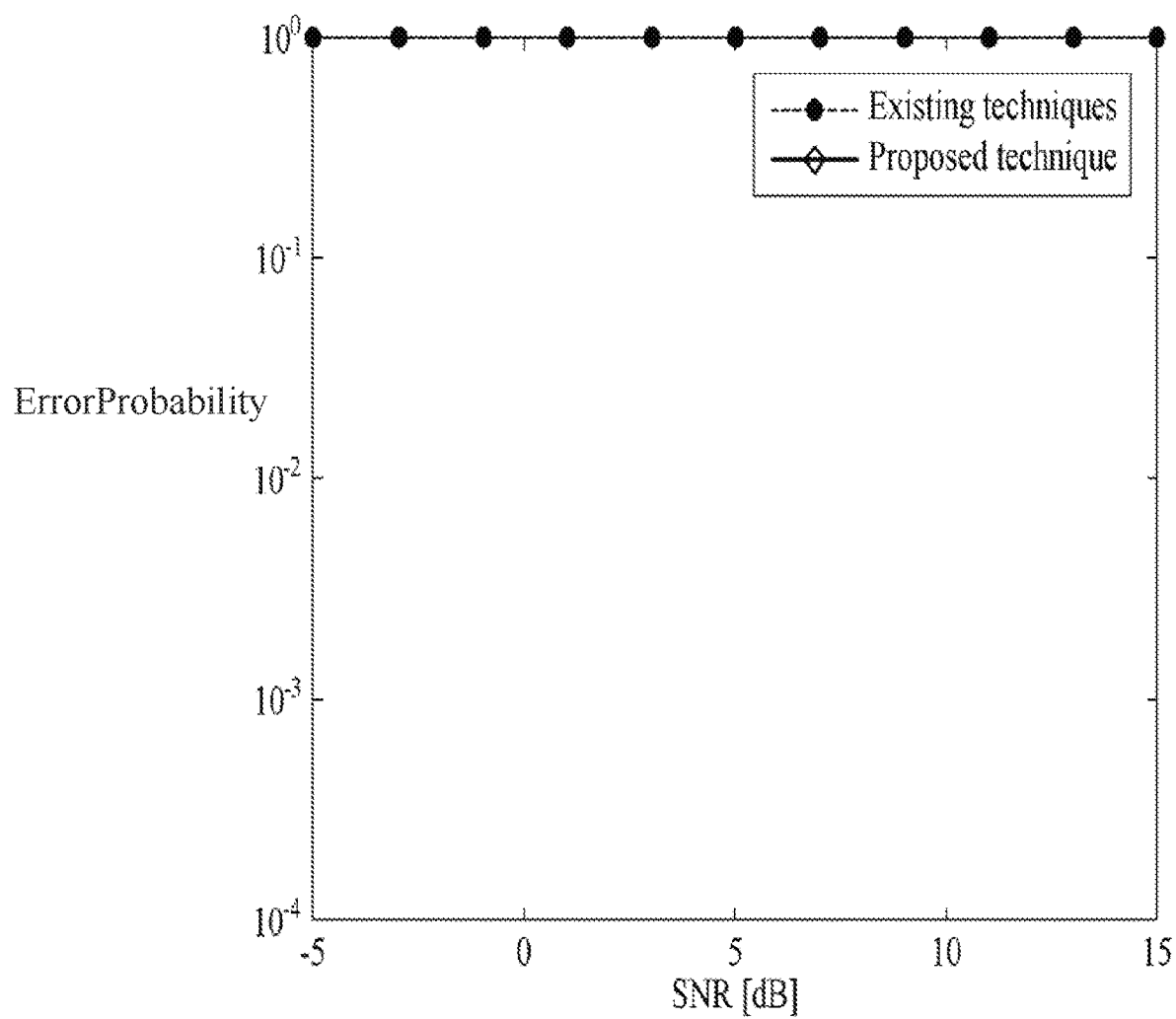

SIGNAL SOURCE ESTIMATION METHOD AND APPARATUS PERFORMING THE SAME

CROSS-REFERENCE TO RELATED APPLICATION(S)

This application claims the priority benefit of Korean Patent Application No. 10-2018-0155396 filed on Dec. 5, 2018, and Korean Patent Application No. 10-2019-0142791 filed on Nov. 8, 2019, in the Korean Intellectual Property Office, the disclosures of which are incorporated herein by reference for all purposes.

BACKGROUND

1. Field of the Invention

One or more example embodiments relate to a signal source estimation method and apparatus performing the same.

2. Description of the Related Art

It is possible to detect the number of signal sources and estimate angles of arrival of signal sources at reception points of the reception signals using a difference in phase or amplitude of reception signals received at antennas constituting an array antenna. Further, it is possible to estimate positions of signal sources based on array antennas positioned at a plurality of locations and signals received by the array antennas.

Existing signal source position estimation technologies may have limited resolutions if the signal sources are positioned close, that is, if angles of arrival of two signal sources are similar at reception points, and thus may not accurately estimate angles of arrival and positions of signal sources.

The resolutions may be improved by increasing transmission powers of the signal sources, increasing the number of antennas of the array antenna and the aperture size, or increasing the number of reception samples. However, the increase in the number of antennas of the array antenna and the aperture size leads to an increase in the cost of a system of estimating an angle of arrival and a signal source.

SUMMARY

An aspect provides technology for increasing the signal source number detection performance, the angle of arrival estimation performance, and the signal source position estimation performance.

According to an aspect, there is provided a signal source estimation method including acquiring first reception signals received by first receivers, among signals radiated from signal sources, selecting second receivers receiving reception signals to be used to estimate the signal sources, from among the first receivers based on the first reception signals, and detecting the number of signal sources based on second reception signals received by the second receivers.

The selecting may include generating a reception signal vector by vectorizing the first reception signals, and selecting the second receivers based on the reception signal vector.

The detecting may include calculating a first covariance matrix based on the first reception signals, and detecting the number of signal sources based on the first covariance matrix.

The selecting of the second receivers based on the reception signal vector may include selecting the second receivers based on a rank of a steering matrix formed based on the reception signal vector.

The selecting of the second receivers based on the rank of the steering matrix may include selecting the second receivers such that the rank may have a full rank or the rank may be maximized.

The selecting may include selecting the second receivers such that a position interval between the second receivers may be maximized.

The signal source estimation method may further include estimating positions and angles of arrival of the signal sources based on the detected number of signal sources.

The estimating may include calculating second covariance matrices based on the first reception signals, selecting a third covariance matrix to be used to estimate the positions and the angles of arrival of the signal sources, from among the second covariance matrices based on the number of signal sources, and estimating the positions and the angles of arrival of the signal sources based on the third covariance matrix.

The selecting of the third covariance matrix may include classifying eigenvalues of the second covariance matrices into first eigenvalues and second eigenvalues based on the number of signal sources, and selecting the third covariance matrix based on the first eigenvalues and the second eigenvalues.

The acquiring may include acquiring position information of the first receivers, broadcasting a result of selecting the second receivers and a transmission order to the first receivers, and acquiring the second reception signals from the second receivers based on the transmission order.

The acquiring may include transmitting the number of signal sources to the first receivers, and acquiring at least one of the positions and the angles of arrival of the signal sources, and the third covariance matrix from a receiver receiving a signal corresponding to the third covariance matrix, among the first receivers.

According to an aspect, there is provided a signal source estimation apparatus including a memory configured to store instructions, and a processor configured to execute the instructions, wherein when the instructions are executed by the processor, the processor may be configured to acquire first reception signals received by first receivers, among signals radiated from signal sources, select second receivers receiving reception signals to be used to estimate the signal sources, from among the first receivers based on the first reception signals, and detect the number of signal sources based on second reception signals received by the second receivers.

The processor may be configured to generate a reception signal vector by vectorizing the first reception signals, and select the second receivers based on the reception signal vector.

The processor may be configured to calculate a first covariance matrix based on the first reception signals, and detect the number of signal sources based on the first covariance matrix.

The processor may be configured to select the second receivers based on a rank of a steering matrix formed based on the reception signal vector.

The processor may be configured to select the second receivers such that the rank may have a full rank or the rank may be maximized.

The processor may be configured to select the second receivers such that a position interval between the second receivers may be maximized.

The processor may be configured to estimate positions and angles of arrival of the signal sources based on the detected number of signal sources.

The processor may be configured to calculate second covariance matrices based on the first reception signals, select a third covariance matrix to be used to estimate the positions and the angles of arrival of the signal sources, from among the second covariance matrices based on the number of signal sources, and estimate the positions and the angles of arrival of the signal sources based on the third covariance matrix.

The processor may be configured to classify eigenvalues of the second covariance matrices into first eigenvalues and second eigenvalues based on the number of signal sources, and select the third covariance matrix based on the first eigenvalues and the second eigenvalues.

The processor may be configured to acquire position information of the first receivers, broadcast a result of selecting the second receivers and a transmission order to the first receivers, and acquire the second reception signals from the second receivers based on the transmission order.

The processor may be configured to transmit the number of signal sources to the first receivers, and acquire at least one of the positions and the angles of arrival of the signal sources, and the third covariance matrix from a receiver receiving a signal corresponding to the third covariance matrix, among the first receivers.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIGS. 5A to 5B and 6A to 6B are graphs illustrating the signal source number detection performance of the signal source estimation apparatus of FIG. 3.

DETAILED DESCRIPTION

Figure 1:
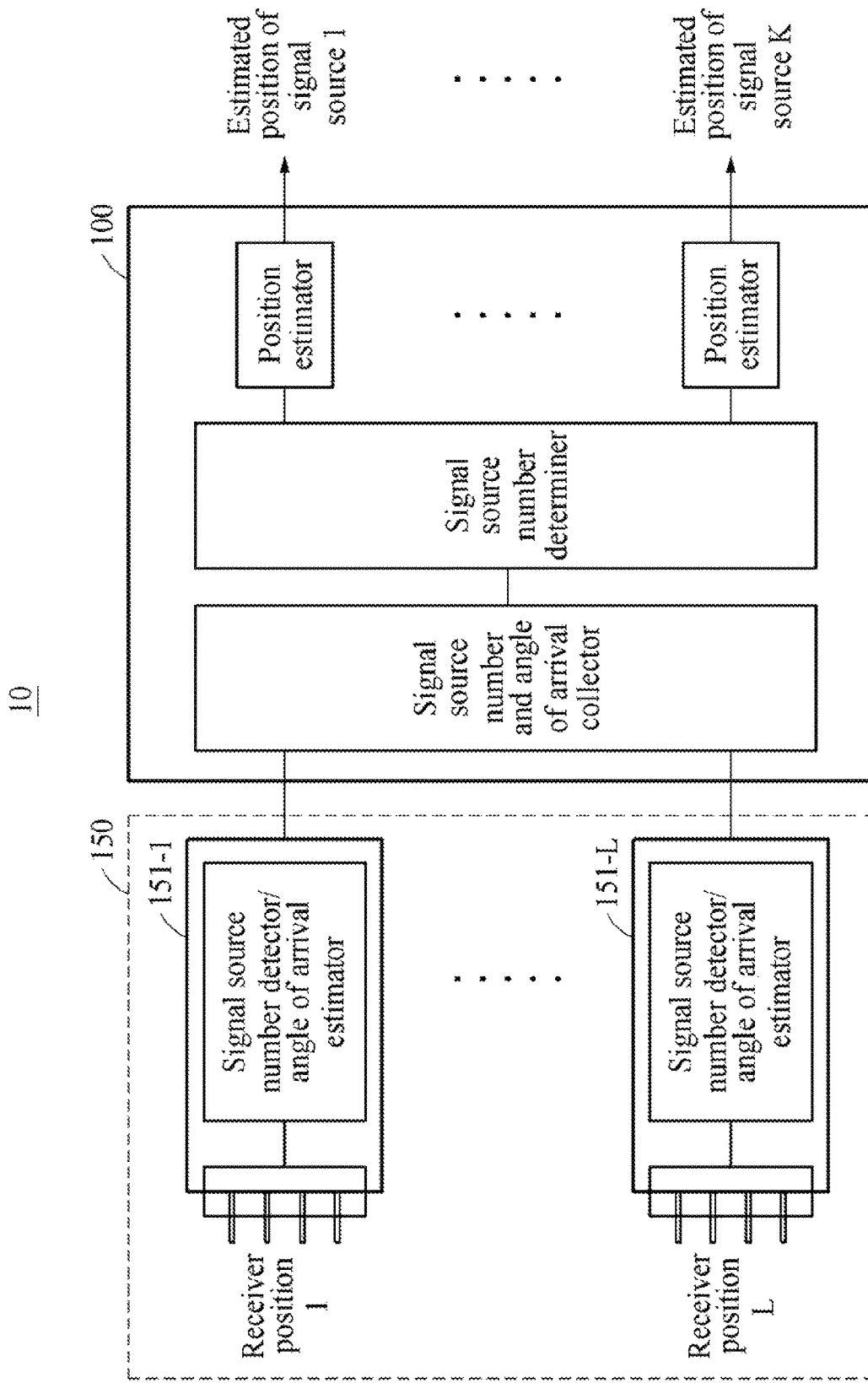
FIG. 1 is a diagram illustrating an example of a system for estimating the number of signal sources, angles of arrivals, and positions of the signal sources according to a related art.

Hereinafter, some example embodiments will be described in detail with reference to the accompanying drawings. However, various alterations and modifications may be made to the example embodiments. Here, the example embodiments are not construed as limited to the disclosure and should be understood to include all changes, equivalents, and replacements within the idea and the technical scope of the disclosure.

The terminology used herein is for the purpose of describing particular example embodiments only and is not to be limiting of the example embodiments. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

FIG. 1 is a diagram illustrating an example of a system for estimating the number of signal sources, angles of arrivals, and positions of the signal sources according to a related art.

A signal source estimation system 10 may estimate the number of signal sources, angles of arrival, and positions of the signal sources using an array antenna. For example, the signal source estimation system 10 may detect the number of signal sources and estimate the angles of arrival using a difference in phase (or phase and amplitude) of reception signals of antennas constituting the array antenna.

The signal source estimation system 10 may estimate the positions of the signal sources using array antennas implemented at a plurality of positions. For example, the signal source estimation system 10 may estimate the positions of the signal sources based on the detected number of signal sources and the estimated angles of arrival.

The signal source estimation system 10 may include a receiver 150 and a signal source estimation apparatus 100.

The receiver 150 may include receivers 151-1, ..., 151-L implemented at a plurality of receiver positions, for example, L positions.

The signal source estimation apparatus 100 may estimate the positions of the signal sources based on reception signals received by the receiver 150. For example, the signal source estimation apparatus 100 may collect the detected number of signal sources and the angles of arrival based on the reception signals, and estimate the positions of the signal sources based on the collected data.

Although FIG. 1 illustrates an example in which the number of signal sources and the angles of arrival are detected by the receiver 150 and transferred to the signal source estimation apparatus 100, the number of signal sources and the angles of arrival may also be detected by the signal source estimation apparatus 100.

Hereinafter, an example in which the signal source estimation system 10 detects the number of signal sources will be described using equations.

The signal source estimation system 10 may detect the number of signal sources using the Akaike information criterion (AIC) and the minimum description length (MDL).

The signal source estimation system 10 may express an M×1 reception signal vector as in Equation 1, when a single narrow-band signal s(t) enters an array antenna including M antennas at an angle of arrival θ at a time t.

$$y(t)=a(\theta)s(t)+n(t) \quad \text{[Equation 1]}$$

In Equation 1, $a(\theta)$ denotes an M×1 steering vector, and n(t) denotes an additive white Gaussian noise (AWGN) vector at each reception antenna. Elements have an average of 0 and a variance of $\sigma^2$.

The signal source estimation system 10 may express a reception signal y(t) at the point in time t, when K narrow-band signals $s(t)=[s_1(t) \ldots s_K(t)]^T$ arrive at the array antenna respectively at angles of arrival $\theta=[\theta_1 \ldots \theta_K]$, as expressed by Equation 2.

$$y(t)=As(t)+n(t) \quad \text{[Equation 2]}$$

In Equation 2, $A=[a(\theta_1)\,a(\theta_2)\ldots a(\theta_K)]$ denotes an M×K steering matrix.

The signal source estimation system 10 may detect the number of signal sources based on a covariance matrix calculated using T time domain samples. In this example, the signal source estimation system 10 may calculate the covariance matrix $R_y$ as expressed by Equation 3.

$$R_y = \frac{1}{T}\sum_{t=1}^{T} y(t)y^H(t) \quad \text{[Equation 3]}$$

Here, if $R_y$ is eigen-decomposed as in $R_y=U\Lambda U^H$, the eigenvalue may be expressed by Equation 4.

$$\Lambda=\text{diag}[\lambda_1 \lambda_2 \ldots \lambda_M], \lambda_1 \geq \ldots \geq \lambda_M \quad \text{[Equation 4]}$$

Eigenvectors may be expressed to be divided into $U_s$ and $U_n$, as expressed by Equation 5.

$$U=[U_s U_n] \quad \text{[Equation 5]}$$

In this example, $U_s$ denotes eigenvectors corresponding to K eigenvalues including first to K-th eigenvalues when the eigenvalues are arranged in descending order of the eigenvalues, and may span a transmission signal region, and $U_n$ denotes eigenvectors corresponding to M-K eigenvalues including the remaining K-th to M-th eigenvalues in descending order of the eigenvalues, and may span an AWGM region.

The signal source estimation system 10 may calculate the number $\hat{K}_{AIC}$ of signal sources and the number $\hat{K}_{MDL}$ of signal sources using AIC and MDL as expressed by Equations 6 and 7, respectively.

$$\hat{K}_{AIC} = \underset{k}{\text{argmin}}\{-2\log L(k) + 2k(2M-k)\} \quad \text{[Equation 6]}$$

$$\hat{K}_{MDL} = \underset{k}{\text{argmin}}\left\{-\log L(k) + \frac{1}{2}k(2M-k)\log T\right\} \quad \text{[Equation 7]}$$

L(k) is expressed by Equation 8.

$$L(k) = \left(\frac{\prod_{i=k+1}^{M} \lambda_i^{1/(M-k)}}{\frac{1}{M-k}\sum_{i=k+1}^{M}\lambda_i}\right)^{(M-k)T} \quad \text{[Equation 8]}$$

The existing method may have an inaccurate detection performance when signal sources are positioned close, that is, when a difference between angles of arrival is small. Further, when an SNR or the number of samples T is small, the performance may be degraded.

Hereinafter, an example in which the existing signal source estimation system 10 estimates the angles of arrival will be described using equations.

The signal source estimation system 10 may estimate the angles of arrival using the covariance matrix $R_y$ of the reception signals. For example, the signal source estimation system 10 may estimate the angles of arrival using a multiple signal classification (MUSIC) algorithm.

For example, the signal source estimation system 10 may estimate values $\theta_1 \ldots \theta_K$ corresponding to K peaks of a MUSIC spectrum defined by Equation 9, to be angles of arrival $\hat{\theta}=[\hat{\theta}_1 \ldots \hat{\theta}_K]$ with respect to K signal sources, using a characteristic of columns of $U_s$ and columns of $U_n$ being orthogonal to each other. If there is a single signal source, the signal source estimation system 10 may estimate an angle of arrival of the signal source, as expressed by Equation 10.

$$P_{MUSIC}(\theta) = \frac{1}{\|a^H(\theta)U_n\|^2} \quad \text{[Equation 9]}$$

$$\hat{\theta} = \max_{\theta} \frac{1}{\|a^H(\theta)U_n\|^2} \quad \text{[Equation 10]}$$

The scheme of estimating the angles of arrival in the existing signal source estimation system 10 may exhibit a relatively degraded performance if the SNR value or the number of samples T is small.

Further, since the signal source estimation system 10 needs to detect the accurate number of signal sources to separate $U_s$ and $U_n$, the angle of arrival estimation performance may be degraded if the number of signal sources is detected inaccurately.

Hereinafter, an example in which the existing signal source estimation system 10 estimates the positions of the signal sources based on the estimated angles of arrival will be described using equations.

The signal source estimation system 10 may estimate the positions $x_{s_k}=[x_{s_k}, y_{s_k}]$, k=1, ..., K of the signal sources k based on the angles of arrival estimated at L reception points $x_l=[x_l, y_l]$, l=1, ..., L.

The signal source estimation system 10 may express the estimated values $r_k=\hat{\theta}_k=[\hat{\theta}_{1,k}, \hat{\theta}_{2,k} \ldots \hat{\theta}_{L,k}]$ of the angles of arrival of the signal sources k estimated at the L reception points $x_l=[x_l,y_l]$, $l=1, \ldots, L$ using a general measurement model, as given by Equation 11.

$$r_k = f(x_{s_k}) + e_k \quad \text{[Equation 11]}$$

Here, $f(x_{s_k})$ denotes a non-linear positioning function expressed by Equation 12, $e_k$ denotes angle of arrival estimation errors, and indicates an uncorrelated Gaussian process, the components of which have an average of "0" and a variance of $\sigma_{l,k}^2$.

$$f(x_{S_k}) = \theta_k^T = [\theta_{1,k} \ldots \theta_{L,k}]^T = \begin{bmatrix} \tan^{-1} \frac{y_{S_k} - y_{r_1}}{x_{S_k} - x_{r_1}} \\ \vdots \\ \tan^{-1} \frac{y_{S_k} - y_{r_L}}{x_{S_k} - x_{r_L}} \end{bmatrix} \quad \text{[Equation 12]}$$

The signal source estimation system 10 may determine the positions of the signal sources k from the measurement model expressed by Equation 11. For example, the signal source estimation system 10 may determine the positions of the signal sources K from the measurement model expressed by Equation 11, using a non-linear method such as a non-linear least squares algorithm and a maximum likelihood algorithm, and/or a linear method such as a linear least squares algorithm and a weighted linear LS algorithm.

The signal source estimation system 10 may estimate the angles of arrival and estimate the positions of the signal sources through the procedure described above. In this example, the signal source estimation system 10 may be implemented as a single device and thus, may move to estimate the angles of arrival. Further, a signal source number detector/angle of arrival estimator of the signal source estimation system 10 may be included in each of the receivers 151-1, . . . , 151-L implemented separately from the signal source estimation apparatus 100, to estimate the angles of arrival at the respective receiver positions. In this example, the signal source number detector/angle of arrival estimator may be connected to the signal source estimation apparatus 100 in a wired and/or wireless manner.

Figure 2:
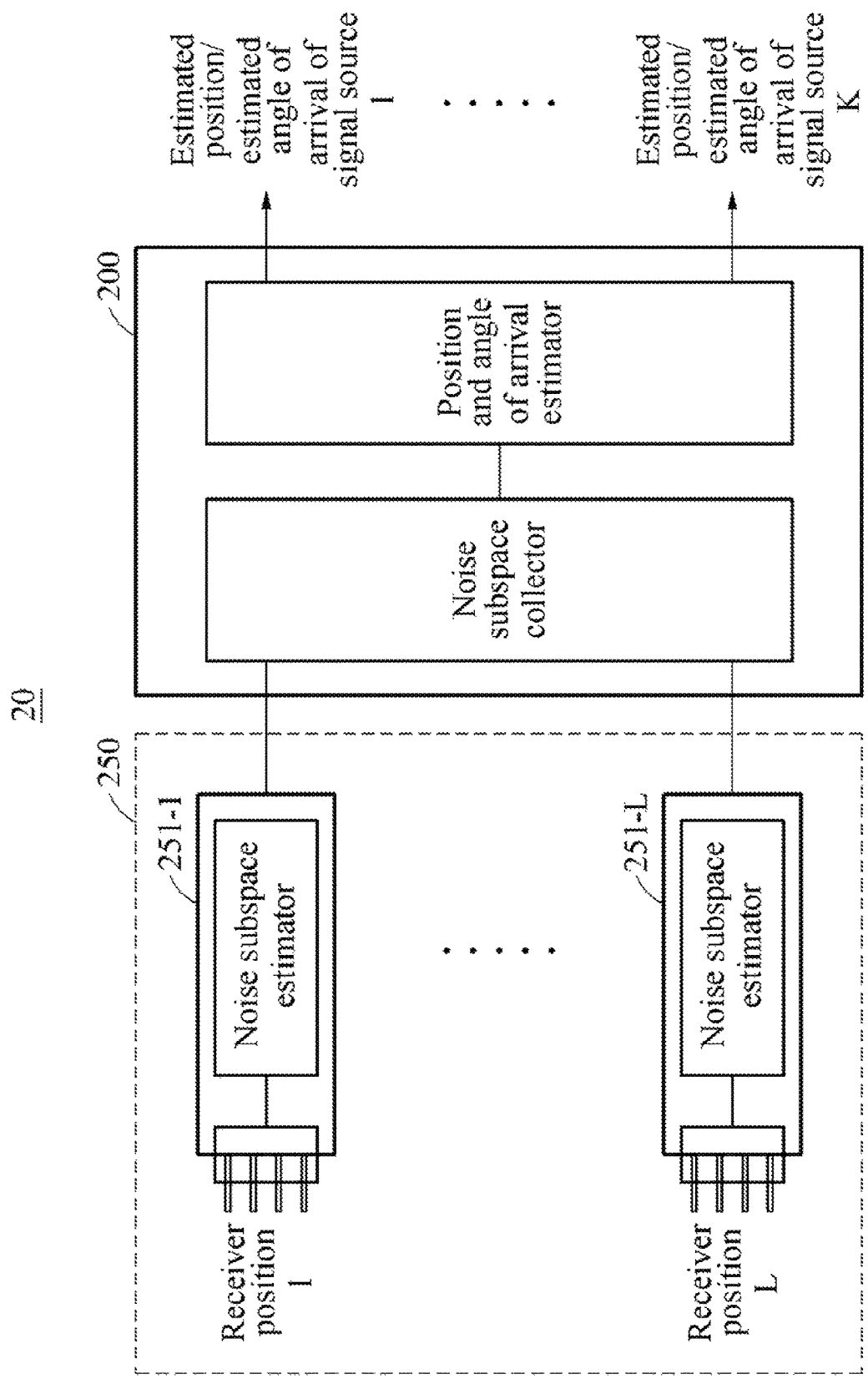
FIG. 2 is a diagram illustrating an example of a system for estimating angles of arrival and positions of signal sources according to a related art.

FIG. 2 is a diagram illustrating an example of a system for estimating angles of arrival and positions of signal sources according to a related art.

A signal source estimation system 20 may directly estimate positions of signal sources, without estimating angles of arrival. For example, the signal source estimation system 20 may estimate the positions of the signal sources by calculating a noise subspace of a covariance matrix of reception signals at respective reception positions.

The signal source estimation system 20 may include a receiver 250 and a signal source estimation apparatus 200.

The receiver 250 may include receivers 251-1, . . . , 251-L at L receiver positions. The receivers 251-1, . . . , 251-L may each include a noise subspace estimator.

The signal source estimation system 20 may calculate eigenvectors $U_{l,n}$ spanning an AWGN region from a covariance $$R_{y_l} = \frac{1}{T} \sum_{t=1}^{T} y_l(t) y_l^H(t)$$

of reception signals, similar to the signal source estimation system 10 using the MUSIC algorithm.

The signal source estimation system 20 may calculate spatial power spectra $P_{MUSIC}^{SDF}(x_{S_k})$ defined by Equation 13 from the eigenvectors $U_{1,n}, \ldots, U_{L,n}$ corresponding to the reception signals received by the L receivers 250-1, . . . , 251-L at the respective positions.

$$P_{MUSIC}^{SDF}(x_{S_k}) = \frac{1}{\sum_{l=1}^{L} \|a_l^H(x_{S_k}) U_{l,n}\|^2} \quad \text{[Equation 13]}$$

Here, $x_{S_k}$ denotes the positions of the signal sources k.

The signal source estimation system 20 may estimate coordinates $x_{S_1}, \ldots, x_{S_K}$ corresponding to K peaks of the spatial power spectra $P_{MUSIC}^{SDF}(x_{S_k})$, to be the positions of the signal sources.

The signal source estimation system 20 may estimate angles of arrival at the reception positions of the receivers 250-1, . . . , 251-L based on the position information of the receivers 250-1, . . . , 251-L and the estimated positions of the signal sources, or may perform the estimation independently at respective positions.

For the signal source estimation system 20 to estimate the positions of the signal sources, the receivers 250-1, . . . , 251-L may need to detect the number of signal sources. Thus, when the signal sources are positioned close, that is, when a difference between the angels of arrival is small, the signal source estimation system 20 may have an inaccurate detection performance. Further, the signal source estimation system 20 may exhibit a degraded signal source position estimation performance if the SNR or the number T of samples is small.

Further, if the receivers 250-1, . . . , 251-L detects the number of signal sources inaccurately, the signal source position estimation performance and the angle of arrival estimation performance may be degraded.

Figure 3:
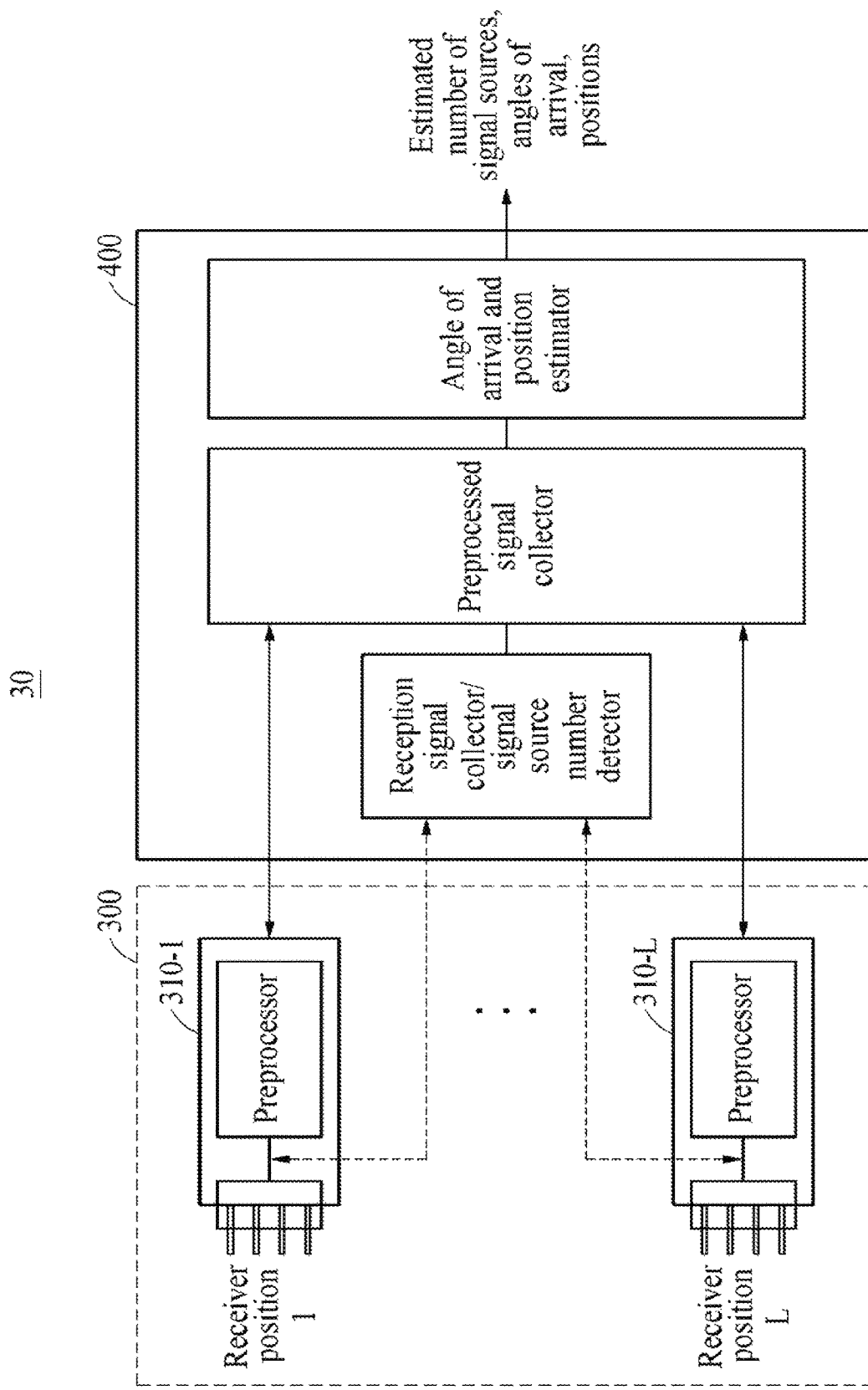
FIG. 3 is a diagram illustrating a signal source estimation system according to an example embodiment.
Figure 4:
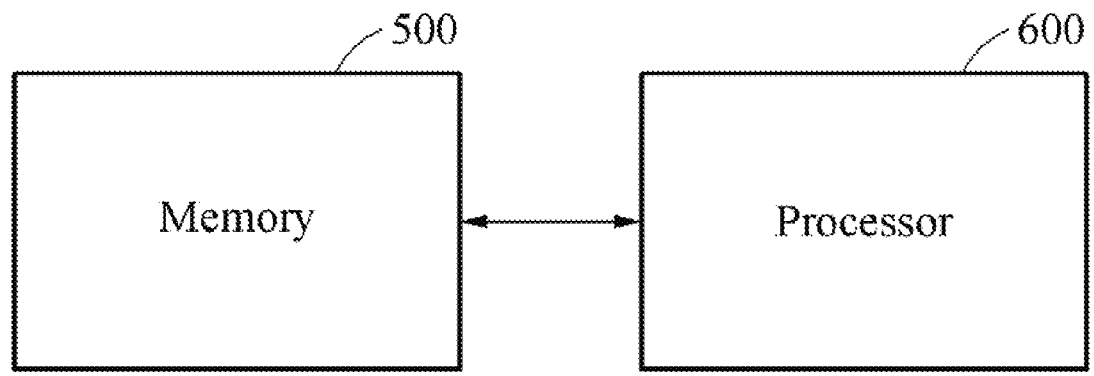
FIG. 4 is a block diagram illustrating a signal source estimation apparatus of FIG. 3.

FIG. 3 is a diagram illustrating a signal source estimation system according to an example embodiment, and FIG. 4 is a block diagram illustrating a signal source estimation apparatus of FIG. 3.

A signal source estimation system 30 estimates signal sources based on reception signals. For example, the signal source estimation system 30 may estimate the number of signal sources, angles of arrival, and/or positions of the signal sources based on the reception signals received at a plurality of positions.

The signal source estimation system 30 may improve the signal source number detection performance, the angle of arrival estimation performance, and/or the signal source position estimation performance, by solving the issues of the existing signal source estimation systems 10 and 20.

The existing signal source estimation systems 10 and 20 are merely examples of existing technologies that may be used by the signal source estimation system 30, and the signal source estimation system 30 may be expanded to a system for detecting the number of signal sources, estimating the angles of arrival, and/or estimating the positions of the signal sources using other algorithms.

The signal source estimation system 30 may form a virtual augmented array antenna system including more antennas by vectorizing signals received at a plurality of positions, and detect the number of signal sources using reception signals of the augmented array antenna system.

When vectorizing the reception signals received at the plurality of positions, the signal source estimation system 30 may select reception positions at which reception signals to be used for vectorization are to be received, such that a steering matrix formed by the virtual augmented array antenna system has a full rank or a nearly full rank.

The signal source estimation system 30 may use the detected number of signal sources to estimate the positions of the signal sources. For example, the signal source estimation system 30 may determine an eigenvalue of the smallest signal source and an eigenvalue of the greatest AWGN, among the eigenvalues of the covariance matrix, and determine whether to use the covariance matrix or the estimated angles of arrival to estimate the angels of arrival and/or the positions of the signal sources based on a difference between the two values.

The signal source estimation system 30 may include a receiver 300 and a signal source estimation apparatus 400.

The receiver 300 may include receivers 310-1, . . . , 310-L provided at a plurality of receiver positions, for example, at L positions. The receivers 310-1, . . . , 310-L may receive reception signals, among signals radiated from signal sources. Further, the receivers 310-1, . . . , 310-L may each include a preprocessor. The preprocessor may include a function to estimate an angle of arrival and a position.

Although FIG. 3 illustrates the receiver 300 including the plurality of receivers 310-1, . . . , 310-L, a single receiver 300 may be implemented to receive signals while moving among receiver positions.

The receiver 300 may be connected to the signal source estimation apparatus 400 in a wired/wireless manner.

The signal source estimation apparatus 400 may include a memory 500 and a processor 600.

The memory 500 may store instructions or a program executable by the processor 600. For example, the instructions may include instructions to perform an operation of the processor 600 and/or an operation of each component of the processor 600.

The processor 600 may process data stored in the memory 500. The processor 600 may execute computer-readable codes, for example, software, stored in the memory 500 and instructions triggered by the processor 600.

The processor 600 may be a data processing device implemented by hardware including a circuit having a physical structure to perform desired operations. For example, the desired operations include instructions or codes included in a program.

For example, the hardware-implemented data processing device may include a microprocessor, a central processing unit (CPU), a processor core, a multi-core processor, a multiprocessor, an application-specific integrated circuit (ASIC), and a field programmable gate array (FPGA).

The processor 600 may acquire the reception signals received by the receiver 300. For example, the processor 600 may acquire first reception signals received by the receivers 310-1, . . . , 310-L.

The processor 600 may select second receivers receiving reception signals to be used to estimate the signal sources, from among the receivers 310-1, . . . , 310-L based on the first reception signals.

For example, the processor 600 may generate a reception signal vector by vectorizing the first reception signals, and select the second receivers based on the reception signal vector.

The processor 600 may detect the number of signal sources based on second reception signals received by the second receivers.

Hereinafter, an example in which the processor 600 detects the number of signal sources will be described in detail.

To describe the example in which the processor 600 detects the number of signal sources, it may be assumed that the processor 600 estimates two signal sources $s_1(t)$ and $s_2(t)$ respectively positioned at $x_{s_1}=[x_{s_1}, y_{s_1}]$ and $x_{s_2}=[x_{s_k}, y_{s_k}]$, in detail, the number of signal sources, angles of arrival at the positions, and the positions of the signal sources. In this example, L independent receivers 310-1, . . . , 310-L disposed at L positions $x_l=[x_l,y_l]$, l=1, . . . , L may also be considered.

Signals received at a time t may be expressed by Equation 14.

$$y_1(t) = [a_{1,1}(\theta_{1,1}) a_{1,2}(\theta_{1,2})] \begin{bmatrix} h_{1,1}s_1(t) \\ h_{1,2}s_2(t) \end{bmatrix} + n_1(t) \quad \text{[Equation 14]}$$

$$y_2(t) = [a_{2,1}(\theta_{2,1}) a_{2,2}(\theta_{2,2})] \begin{bmatrix} h_{2,1}s_1(t) \\ h_{2,2}s_2(t) \end{bmatrix} + n_2(t)$$

$$\vdots$$

$$y_L(t) = [a_{L,1}(\theta_{L,1}) a_{L,2}(\theta_{L,2})] \begin{bmatrix} h_{L,1}s_1(t) \\ h_{L,2}s_2(t) \end{bmatrix} + n_3(t)$$

In this example, $h_{l,k}$ denotes coefficients reflecting a phase difference and an amplitude of the same signal received at the reception positions of the receivers 310-1, . . . , 310-L that may occur due to various factors including different distances between the signal sources and the receivers 310-1, . . . , 310-L.

The processor 600 may generate a reception signal vector by vectorizing $L_{sel}$ reception signals selected from among the L first reception signals received by the receivers 310-1, . . . , 310-L, as expressed by Equation 15.

$$y_{Aug}(t) = \begin{bmatrix} y_1(t) \\ \vdots \\ y_{L_{sel}}(t) \end{bmatrix} \quad \text{[Equation 15]}$$

The processor 600 may calculate covariance matrices based on the reception signal vector $y_{Aug}(t)$, t=1, . . . T, as expressed by Equation 16.

$$R_{y_{Aug}} = \frac{1}{T} \sum_{t=1}^{T} y_{Aug}(t) y_{Avg}^H(t) \quad \text{[Equation 16]}$$

The processor 600 may detect the number $\hat{K}_{Aug}$ of signal sources through the existing methods described above, based on the covariance matrices $R_{y_{Aug}}$. For example, the processor 600 may detect the number $\hat{K}_{Aug\_MDL}$ of signal sources using MDL.

The reception signal vector $y_{Aug}(t)$, t=1, . . . , T may be expressed as an augmented array antenna system, as given by Equation 17.

$$\underbrace{\begin{bmatrix} y_1(t) \\ \vdots \\ y_{L_{sel}}(t) \end{bmatrix}}_{y_{Aug}(t)} = \underbrace{\begin{bmatrix} h_{1,1}a_{1,1}(\theta) & h_{1,2}a_{1,2}(\theta1,2) \\ \vdots & \vdots \\ h_{L_{sel},1}a_{L_{sel},2}(\theta) & h_{L_{sel},2}a_{L_{sel},2}(\theta_{L_{sel},2}) \end{bmatrix}}_{A_{Aug}} \quad \text{[Equation 17]}$$

-continued $$\underbrace{\begin{bmatrix} s_1(t) \\ s_2(t) \end{bmatrix}}_{s(t)} + \underbrace{\begin{bmatrix} n_1(t) \\ \vdots \\ n_{L_{sel}}(t) \end{bmatrix}}_{n_{Aug}(t)}$$

The processor 600 may select the $L_{sel}$ second reception signals based on a rank of a steering matrix $A_{Aug}$ newly formed, when forming the reception signal vector $y_{Aug}(t)$, t=1, ..., T as a virtual augmented array antenna system, such that the steering matrix $A_{Aug}$ may have an excellent signal source estimation performance. For example, the processor 600 may select $L_{sel}$ second reception signals such that the rank of the steering matrix $A_{Aug}$ may be close to a full rank.

The processor 600 may select reception positions of the second receivers such that a position interval between the receivers 310-1, ..., 310-L is maximized, to select the $L_{sel}$ second reception signals such that the rank of the steering matrix $A_{Aug}$ may be close to the full rank.

The operation of the processor 600 for the reception signal vectorization and the reception position selection may also apply to an example in which a single receiver 300 receives signals while moving.

The processor 600 may not need to estimate $h_{l,k}$.

The processor 600 may select a covariance matrix to be used to estimate the angles of arrival and the positions of the signal sources based on the detected number of signal sources, when estimating the angles of arrival and the positions of the signal sources using the covariance matrices or the estimated angles of arrival of the reception signals.

Hereinafter, an example in which the processor 600 selects a covariance matrix based on the detected number of signal sources will be described in detail.

The processor 600 may classify eigenvalues $\lambda_{l,1} \geq \ldots \geq \lambda_{l,M}$ of the covariance matrices $R_{y_l}$, l=1, ... L calculated based on the L reception signals, into eigenvalues $\lambda_{l,1} \geq \ldots \geq \lambda_{l,\hat{K}_{Aug}}$ of the signal sources and eigenvalues $\lambda_{l,\hat{K}_{Aug}+1} \geq \ldots \geq \lambda_{l,M}$ of AWGN based on the detected number $\hat{K}_{Aug}$ of signal sources.

In this example, the covariance matrices $R_{y_l}$, l=1, ..., L may be calculated by the preprocessors respectively included in the receivers 310-1, ..., 310-L, or may be calculated based on the L reception signals acquired by the processor 600.

The processor 600 may compare a minimum value of the eigenvalues $\lambda_{l,1} \geq \ldots \geq \lambda_{l,\hat{K}_{Aug}}$ of the signal sources and a maximum value of the eigenvalues $\lambda_{l,\hat{K}_{Aug}+1} \geq \ldots \geq \lambda_{l,M}$ of the AWGN, select a covariance matrix $R_{y_l}$, l=1, ..., L in which a difference between the minimum value and the maximum value is greater than a threshold $\gamma_{th}$, and use the selected covariance matrix $R_{y_l}$, l=1, ..., L to estimate the positions of the signal sources and the angles of arrival. For example, the processor 600 may select the covariance matrix $R_{y_l}$, l=1, ..., L satisfying Equation 18.

$$\lambda_{l,\hat{K}_{Aug}} - \lambda_{l,\hat{K}_{Aug}+1} > \gamma_{th} \quad \text{[Equation 18]}$$

Hereinafter, an example of exchanging information between the receiver 300 and the signal source estimation apparatus 400 will be described.

The receiver 300 may transmit position information of the receivers 310-1, ..., 310-L to the signal source estimation apparatus 400.

In this example, if the receivers 310-1, ..., 310-L are implemented as a single mobile receiver (here, 310-1, ..., 310-L indicate different positions of the single receiver), the receiver 300 may transmit only velocity information of the receivers 310-1, ..., 310-L to the signal source estimation apparatus 400.

Further, if it is possible to estimate the position information and/or the velocity information of the receivers 310-1, ..., 310-L, without exchanging information between the receiver 300 and the signal source estimation apparatus 400, the receiver 300 may not transmit the position information and/or the velocity information to the signal source estimation apparatus 400.

The signal source estimation apparatus 400 may transmit selection information and/or a transmission order of receivers receiving reception signals to be used to estimate the signal sources to all the receivers 310-1, ..., 310-L.

The selected receivers may transmit reception signals to the signal source estimation apparatus 400 based on the selection information and/or the transmission order.

The signal source estimation apparatus 400 may transmit the detected number $\hat{K}_{Aug}$ of signal sources to the receiver 300.

The receiver 300 may transmit the covariance matrices and/or the estimated angles of arrival to the signal source estimation apparatus 400 only through receivers receiving reception signals corresponding to the covariance matrices used to estimate the angles of arrival and the positions of the signal sources based on the detected number of signal sources. For example, among the receivers 310-1, ..., 310-L, only receivers in which the covariance matrices of the reception signals satisfy Equation 18 may transmit the covariance matrices and/or the estimated angles of arrival to the signal source estimation apparatus 400.

The signal source estimation system 30 may increase the signal source number detection performance. Further, the signal source estimation system 30 may increase the angle of arrival and signal source position estimation performance as the signal source detection performance increases.

The signal source estimation system 30 may increase the angle of arrival estimation performance and the signal source position estimation performance by selecting a covariance matrix to be used to estimate the angles of arrival and the positions of the signal sources.

FIGS. 5A through 6B are graphs illustrating the signal source number detection performance of the signal source estimation apparatus of FIG. 3.

Figure 5A:
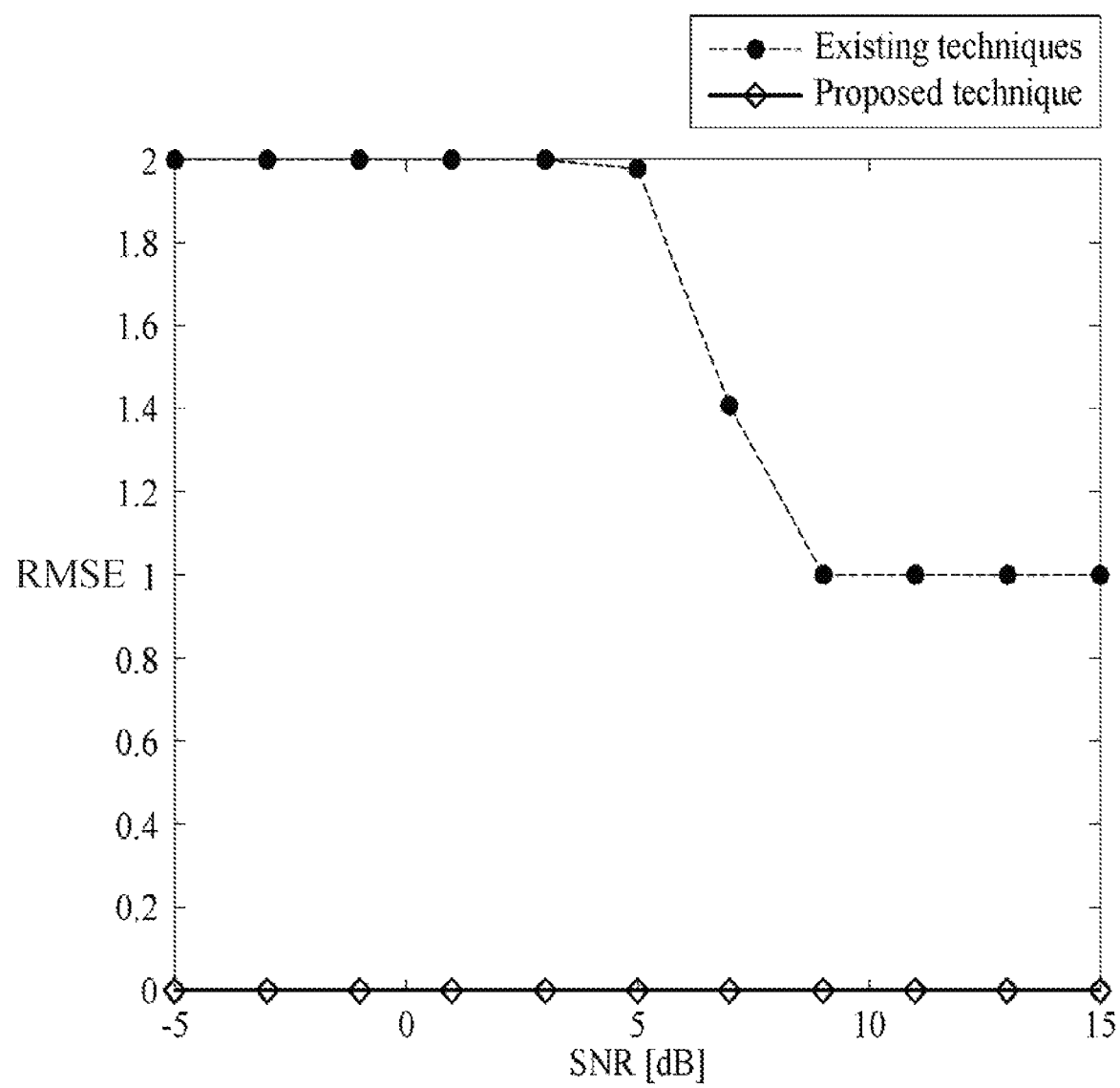

FIGS. 5A and 5B show results of comparing the signal source number detection performance of the signal source estimation system 30 to the signal source number detection performances of the existing signal source estimation systems 10 and 20 through Monte Carlo simulation.

Actual angles of arrival in the existing signal source estimation systems 10 and 20 are $[\theta_1, \theta_2, \theta_3]=[67.218, 65.298, 63.435]$, and actual angles of arrival at reception positions of the signal source estimation system 30 are shown below in Table 1.

TABLE 1

|    | L1       | L2       | L3       | L4       | L5       | L6       | L7       | L8       | L9       | L10      |
|----|----------|----------|----------|----------|----------|----------|----------|----------|----------|----------|
| K1 | 67.21759 | 68.69422 | 70.20112 | 71.73711 | 73.30076 | 74.89042 | 76.50427 | 78.14022 | 79.79603 | 81.46923 |
| K2 | 65.29757 | 66.7323  | 68.19859 | 69.69553 | 71.22197 | 72.77656 | 74.35775 | 75.96376 | 77.59258 | 79.24203 |
| K3 | 63.43495 | 64.82648 | 66.25051 | 67.70637 | 69.19321 | 70.70995 | 72.25533 | 73.82784 | 75.42578 | 77.04724 |

In the simulation, M=5, T=1000, LL=10, and K=3 may be set.

FIG. 5A shows the root mean square error (RMSE) performance, and FIG. 5B shows the detection error probability. Referring to FIGS. 5A and 5B, it may be learned that the existing signal source estimation systems 10 and 20 have an error probability of "1" in all intervals of SNR=−5~15 dB and thus, exhibit poor detection performances and very poor RMSE performances.

Conversely, the result by the signal source estimation system 30 teaches that the error probability is less than or equal to $10^{-4}$ (the error count was "0" as results of 3000 simulations per each SNR) and that the RMSE performance is close to "0".

Figure 6A:
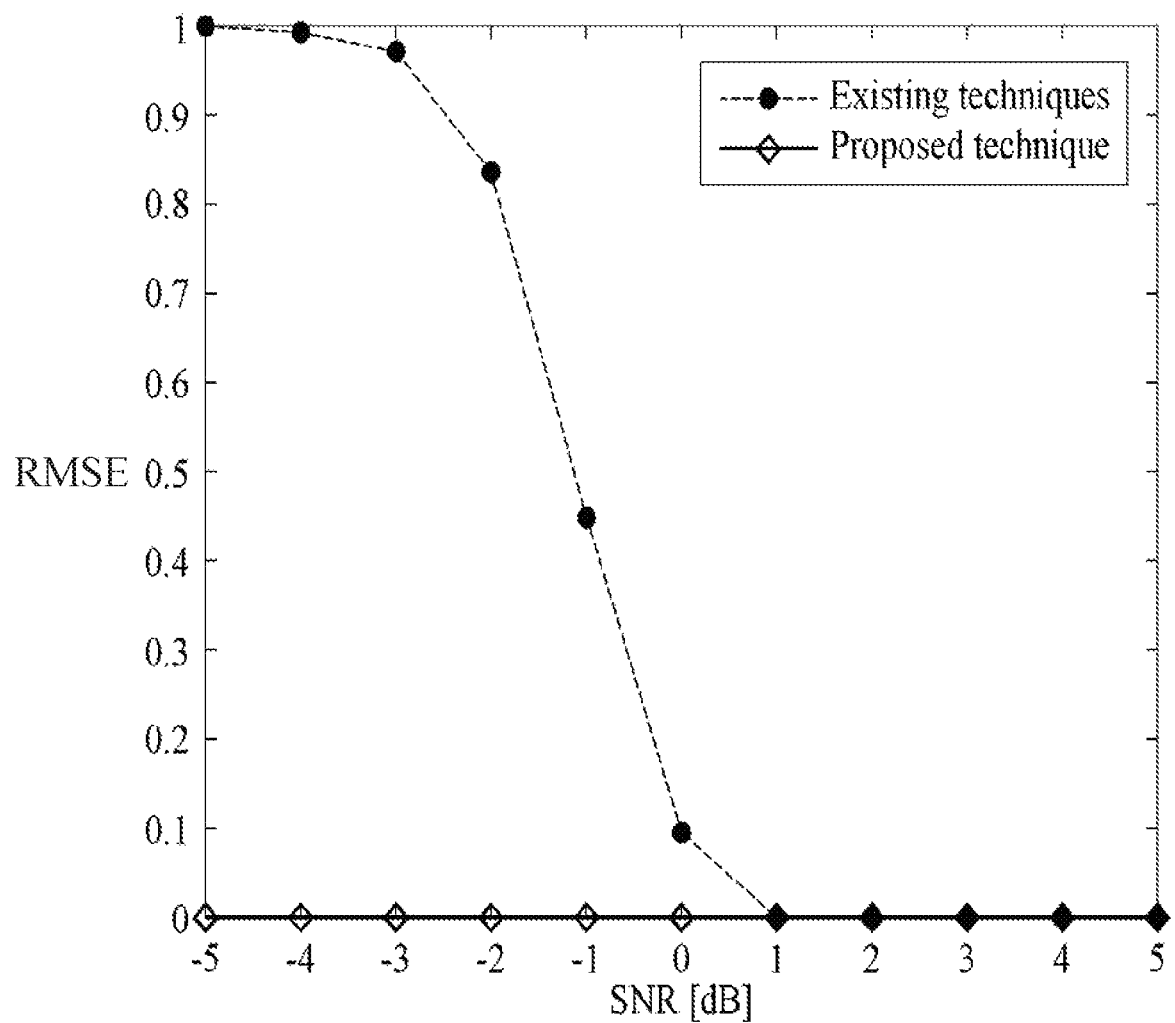
Figure 6B:
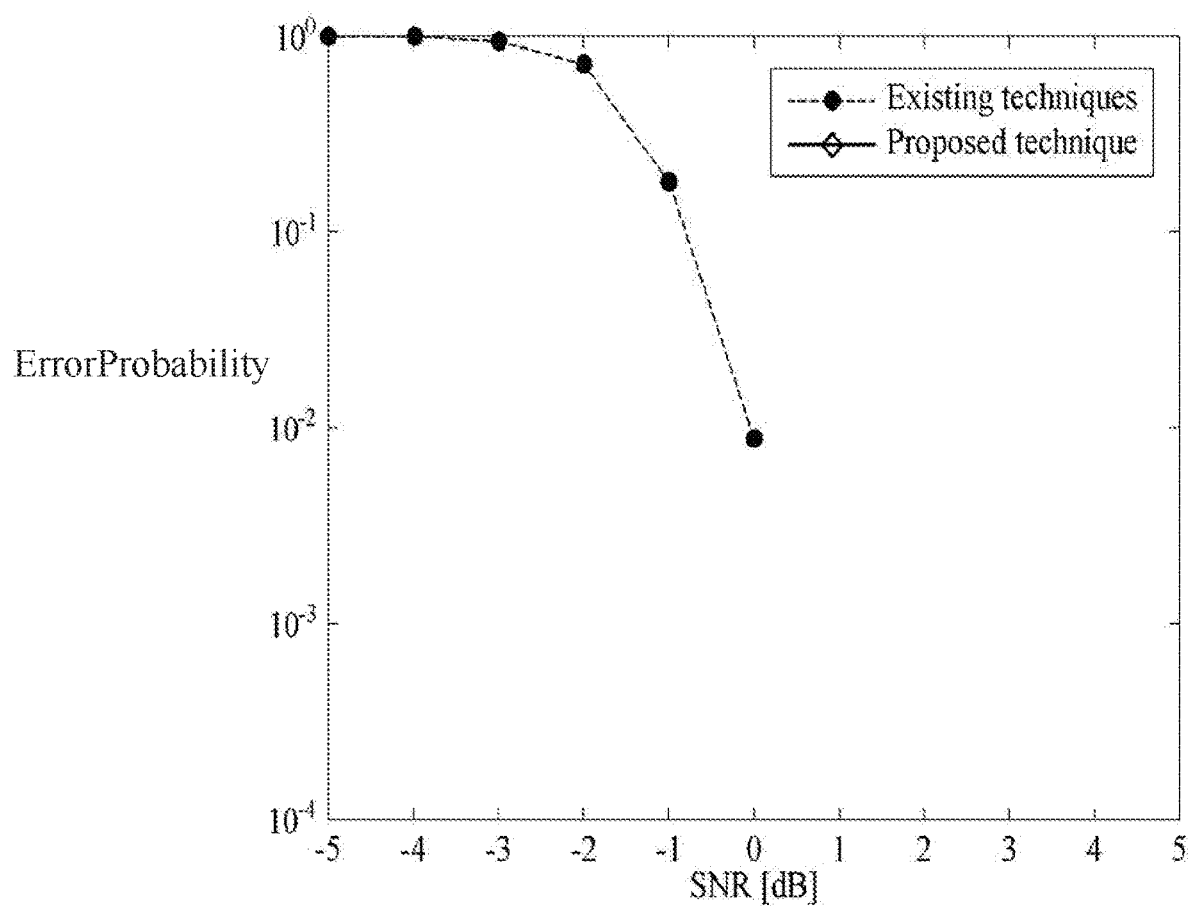

FIGS. 6A and 6B show results of Monte Carlo simulation if M=5, T=1000, LL=10, and K=2 are set. Actual angles of arrival in the existing signal source estimation systems 10 and 20 are $[\theta_1, \theta_2]=[68.199, 59.036]$, and actual angles of arrival at reception positions of the signal source estimation system 30 are shown below in Table 2.

TABLE 2

|    | L1       | L2       | L3       | L4       | L5       | L6       | L7       | L8       | L9       | L10      |
|----|----------|----------|----------|----------|----------|----------|----------|----------|----------|----------|
| K1 | 68.19859 | 69.69553 | 71.22197 | 72.77656 | 74.35775 | 75.96376 | 77.59258 | 79.24203 | 80.90972 | 82.59309 |
| K2 | 59.03624 | 60.31686 | 61.63095 | 62.97842 | 64.35899 | 65.77225 | 67.21759 | 68.69422 | 70.20112 | 71.73711 |

That is, FIGS. 6A and 6B show results of simulation with improved environment for detecting the number of signal sources, by increasing the number T of samples, decreasing the value K, and increasing a difference in angle of arrival between signal sources, when compared to the experiment environment of FIGS. 5A and 5B.

It may be learned that the detection performances of the existing signal source estimation systems 10 and 20 were improved in comparison to the results of FIGS. 5A and 5B, whereas the detection performances are still poor in the low-SNR intervals. Conversely, it may be learned that the signal source estimation system 30 exhibits an excellent detection performance.

Figure 7A:
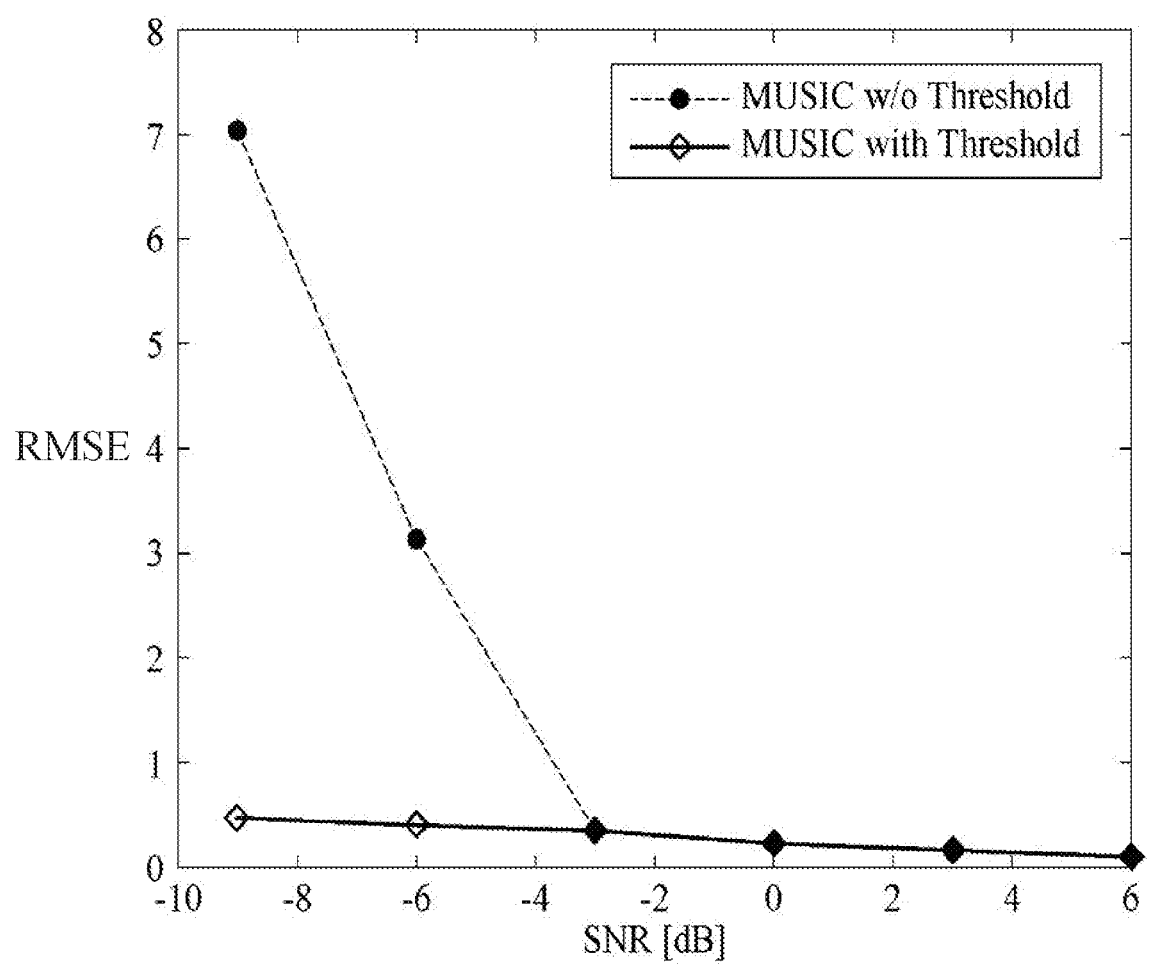
FIGS. 7A and 7B are graphs illustrating the angle of arrival estimation performance of the signal source estimation apparatus of FIG. 3.
Figure 7B:
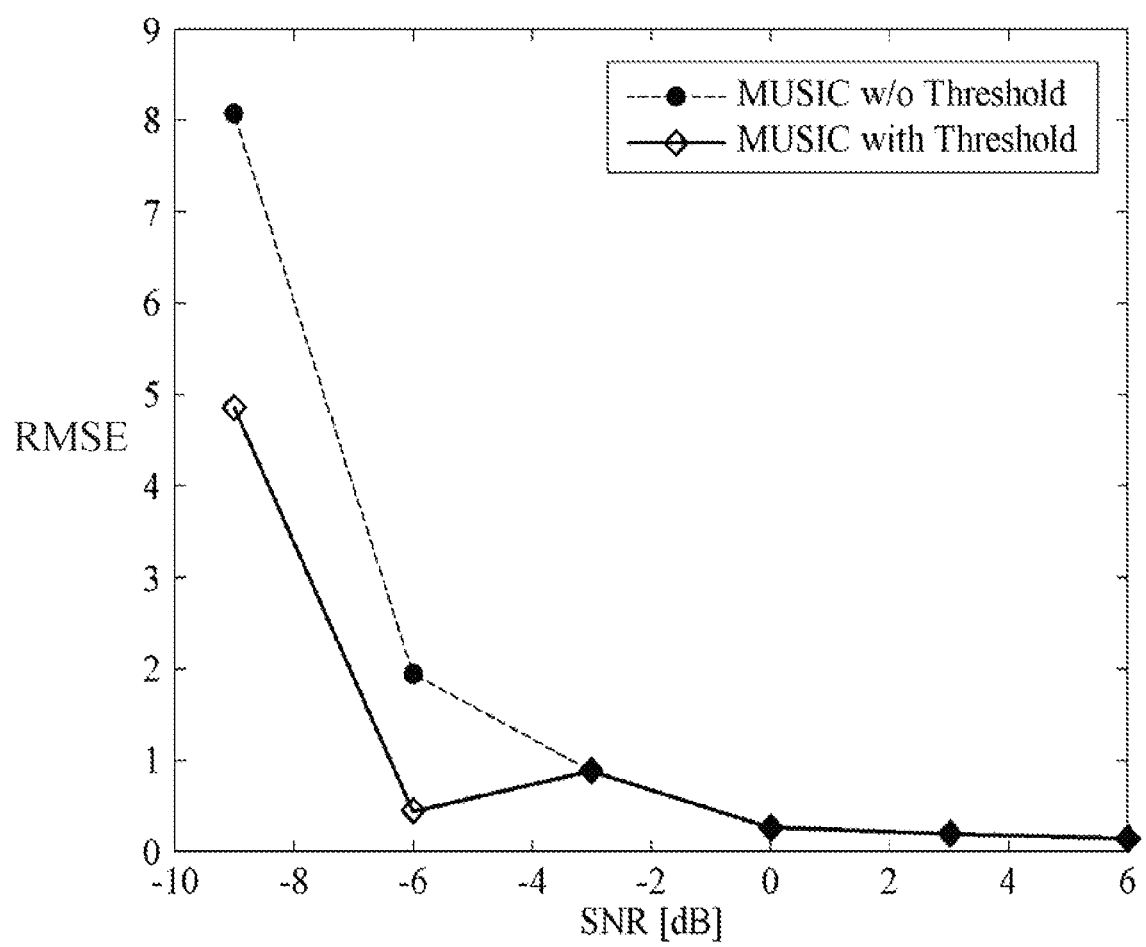

FIGS. 7A and 7B are graphs illustrating the angle of arrival estimation performance of the signal source estimation apparatus of FIG. 3.

FIG. 7A shows a Monte Carlo simulation result of comparing the angle of arrival estimation performance of the signal source estimation system 30 at a single reception point l=1 to those of the existing signal source estimation systems 10 and 20.

In the simulation, M=5, T=2000, K=2, $|\theta_1-\theta_2|>15°$, and $\gamma_{th}=2$ dB may be set.

It may be learned that when the angle of arrival is estimated based on a selection $\lambda_{1,\hat{K}_{Aug}}-\lambda_{1,\hat{K}_{Aug}+1}>\gamma_{th}$ of a covariance matrix of the signal source estimation system 30, the angle of arrival estimation RMSE performance in the low-SNR intervals improves very much, when compared to the existing signal source estimation systems 10 and 20.

FIG. 7B shows a result of the simulation using the number of signal sources detected by the existing signal source estimation systems 10 and 20. That is, FIG. 7B shows a result of the simulation of an example of using $\lambda_{1,\hat{K}_{MLD}}-\lambda_1$, $\hat{K}_{MLD}+1>\gamma_{th}$ for selecting a covariance matrix. Referring to FIG. 7B, it may be learned that the number of signal sources was not detected accurately, and thus the angle of arrival estimation performance was degraded when compared to the example of FIG. 7A.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A signal source estimation method comprising:
    acquiring first reception signals received by first receivers, among signals radiated from signal sources;
    selecting second receivers receiving reception signals to be used to estimate the signal sources, from among the first receivers based on the first reception signals; and
    detecting the number of signal sources based on second reception signals received by the second receivers.

2. The signal source estimation method of claim 1, wherein the selecting comprises:
    generating a reception signal vector by vectorizing the first reception signals; and
    selecting the second receivers based on the reception signal vector.

3. The signal source estimation method of claim 1, wherein the detecting comprises:
    calculating a first covariance matrix based on the first reception signals; and
    detecting the number of signal sources based on the first covariance matrix.

4. The signal source estimation method of claim 2, wherein the selecting of the second receivers based on the reception signal vector comprises selecting the second receivers based on a rank of a steering matrix formed based on the reception signal vector.

5. The signal source estimation method of claim 4, wherein the selecting of the second receivers based on the rank of the steering matrix comprises selecting the second receivers such that the rank has a full rank or the rank is maximized.

6. The signal source estimation method of claim 1, wherein the selecting comprises selecting the second receivers such that a position interval between the second receivers is maximized.

7. The signal source estimation method of claim 1, further comprising:
    estimating positions and angles of arrival of the signal sources based on the detected number of signal sources.

8. The signal source estimation method of claim 7, wherein the estimating comprises:
    calculating second covariance matrices based on the first reception signals;
    selecting a third covariance matrix to be used to estimate the positions and the angles of arrival of the signal sources, from among the second covariance matrices based on the number of signal sources; and
    estimating the positions and the angles of arrival of the signal sources based on the third covariance matrix.

9. The signal source estimation method of claim 8, wherein the selecting of the third covariance matrix comprises:
    classifying eigenvalues of the second covariance matrices into first eigenvalues and second eigenvalues based on the number of signal sources; and
    selecting the third covariance matrix based on the first eigenvalues and the second eigenvalues.

10. The signal source estimation method of claim 1, wherein the acquiring comprises:
    acquiring position information of the first receivers;
    broadcasting a result of selecting the second receivers and a transmission order to the first receivers; and
    acquiring the second reception signals from the second receivers based on the transmission order.

11. The signal source estimation method of claim 7, wherein the acquiring comprises:
    transmitting the number of signal sources to the first receivers; and
    acquiring at least one of the positions and the angles of arrival of the signal sources, and the third covariance matrix from a receiver receiving a signal corresponding to the third covariance matrix, among the first receivers.

12. A signal source estimation apparatus comprising:
    a memory configured to store instructions; and
    a processor configured to execute the instructions,
    wherein when the instructions are executed by the processor, the processor is configured to acquire first reception signals received by first receivers, among signals radiated from signal sources, select second receivers receiving reception signals to be used to estimate the signal sources, from among the first receivers based on the first reception signals, and detect the number of signal sources based on second reception signals received by the second receivers.

13. The signal source estimation apparatus of claim 12, wherein the processor is configured to generate a reception signal vector by vectorizing the first reception signals, and select the second receivers based on the reception signal vector.

14. The signal source estimation apparatus of claim 12, wherein the processor is configured to calculate a first covariance matrix based on the first reception signals, and detect the number of signal sources based on the first covariance matrix.

15. The signal source estimation apparatus of claim 12, wherein the processor is configured to select the second receivers based on a rank of a steering matrix formed based on the reception signal vector.

16. The signal source estimation apparatus of claim 15, wherein the processor is configured to select the second receivers such that the rank has a full rank or the rank is maximized.

17. The signal source estimation apparatus of claim 12, wherein the processor is configured to select the second receivers such that a position interval between the second receivers is maximized.

18. The signal source estimation apparatus of claim 12, wherein the processor is configured to estimate positions and angles of arrival of the signal sources based on the detected number of signal sources.

19. The signal source estimation apparatus of claim 18, wherein the processor is configured to calculate second covariance matrices based on the first reception signals, select a third covariance matrix to be used to estimate the positions and the angles of arrival of the signal sources, from among the second covariance matrices based on the number of signal sources, and estimate the positions and the angles of arrival of the signal sources based on the third covariance matrix.

20. The signal source estimation apparatus of claim 19, wherein the processor is configured to classify eigenvalues of the second covariance matrices into first eigenvalues and second eigenvalues based on the number of signal sources, and select the third covariance matrix based on the first eigenvalues and the second eigenvalues.

\* \* \* \* \*